United States Patent
Shabtay et al.

(10) Patent No.: US 7,093,027 B1
(45) Date of Patent: Aug. 15, 2006

(54) FAST CONNECTION PROTECTION IN A VIRTUAL LOCAL AREA NETWORK BASED STACK ENVIRONMENT

(75) Inventors: Lior Shabtay, Ganai Tikva (IL); Yoav Kluger, Zichron Yakov (IL); Yaron Raz, Emek Sorek (IL)

(73) Assignee: Atrica Israel Ltd., Herzelia (IL)

( * ) Notice: Subject to any disclaimer, the term of this patent is extended or adjusted under 35 U.S.C. 154(b) by 771 days.

(21) Appl. No.: 10/201,852

(22) Filed: Jul. 23, 2002

(51) Int. Cl.
*H04L 12/28* (2006.01)

(52) U.S. Cl. ............... 709/239; 370/216; 370/395.53; 714/4

(58) Field of Classification Search ............... 709/218, 709/228, 238, 239, 242; 370/216–217, 395.53; 714/4
See application file for complete search history.

(56) References Cited

U.S. PATENT DOCUMENTS

| | | | |
|---|---|---|---|
| 6,188,694 B1 * | 2/2001 | Fine et al. ................... | 370/402 |
| 6,307,986 B1 | 10/2001 | Duerksen et al. | |
| 6,321,004 B1 | 11/2001 | Duerksen et al. | |
| 6,438,286 B1 | 8/2002 | Duerksen et al. | |
| 6,512,768 B1 * | 1/2003 | Thomas ....................... | 370/389 |
| 6,766,482 B1 * | 7/2004 | Yip et al. ................... | 714/717 |
| 6,795,394 B1 * | 9/2004 | Swinkels et al. ........... | 370/222 |
| 6,813,242 B1 * | 11/2004 | Haskin et al. ............... | 370/229 |
| 6,834,056 B1 * | 12/2004 | Hayes ......................... | 370/440 |
| 6,904,018 B1 * | 6/2005 | Lee et al. ................... | 370/238 |
| 6,950,883 B1 * | 9/2005 | Capaldi, Jr. et al. ........ | 709/251 |
| 2002/0035640 A1 * | 3/2002 | Greenberg et al. .......... | 709/238 |
| 2002/0093954 A1 * | 7/2002 | Weil et al. ................... | 370/389 |
| 2003/0016624 A1 * | 1/2003 | Bare ........................... | 370/217 |
| 2003/0225906 A1 * | 12/2003 | Natarajan et al. ........... | 709/238 |

OTHER PUBLICATIONS

Marty Borden et al., "A Framework for Metro Ethernet Protection", Metro Ethernet Forum Technical Committee, Oct. 2002.
"White Paper: Ethernet Automatic Protection Switching (EAPS)", Extreme Networks, 2002.
Ping Pan et al., "Fast Reoute Extensions to RSVP-TE for LSP Tunnels", draft-ietf-mpls-rsvp-lsp-fastreroute-00.txt, Internet Engineering Task Force, Network Working Group, Jul. 2002.
Dimitry Haskin et al., "A Method for Setting an Alternative Label Switch Paths to Handle Fast Reroute", draft-haskin-mpls-fast-reroute-05.txt, Internet Engineering Task Force, Nov. 2000.

* cited by examiner

*Primary Examiner*—Dung C. Dinh
(74) *Attorney, Agent, or Firm*—Zaretsky & Associates PC; Howard Zaretsky (57) ABSTRACT

A fast protection mechanism capable of maintaining end-to-end and fast local protection on the order of sub 50 ms for both VLAN only based connections and for connections that are based partially on VLAN technology and partially on MPLS technology. The present invention is suitable for use edge switches configured in a stack or ring topology. The NMS provisions both the main and alternative VLANs in each edge switch in the stack portions of the network. When a link failure occurs, the edge switches on either end of the failed link immediately switch all protected traffic going through that link to the alternative VLAN. The packets are then returned on the links over which they were received. Hello messages are used to signal the remote end that a link failure has occurred and that protected traffic must be switched to the main or alternative VLAN in accordance with the VLAN the Hello message was received on.

47 Claims, 7 Drawing Sheets

FAST CONNECTION PROTECTION IN A VIRTUAL LOCAL AREA NETWORK BASED STACK ENVIRONMENT

FIELD OF THE INVENTION

The present invention relates generally to data communications and more particularly relates to a fast connection protection mechanism for use in a Virtual Local Area Network (VLAN) based stack environment.

BACKGROUND OF THE INVENTION

Currently, the number of data networks and the volume of traffic these networks carry are increasing at an ever increasing rate. The network devices making up these networks generally consist of specialized hardware designed to move data at very high speeds. Typical asynchronous packet based networks, such as Ethernet or MPLS based networks, are mainly comprised of end stations, hubs, switches, routers, bridges and gateways. A network management system (NMS) is typically employed to provision, administer and maintain the network.

Multiprotocol Label Switching (MPLS)

Multiprotocol Label Switching (MPLS) based networks are becoming increasingly popular especially in traffic engineering IP networks. MPLS uses a label switching model to switch data over a Label Switched Path (LSP). The route of an LSP is determined by the network layer routing function or by a centralized entity (e.g., a Network Management System) from the topology of the network, the status of its resources and the demands of the user. Any suitable link state routing protocol may be used such as Open Shortest Path First (OSPF) or Intermediate System to Intermediate System (ISIS) routing protocol to provide the link state topology information needed by the network layer routing to engineer data traffic. Another possibility is to utilize a local neighbor-discovery protocol whereby the global topology is maintained by a centralized management entity. LSPs may be setup using any suitable signaling protocol such as RSVP-TE, CR-LDP or using the management plane (e.g., the NMS setting the relevant MIB items that create the LSPs).

There is increasing demand by users that networks include a mechanism for fast repair of failed links or nodes. Since a LSP traverses a fixed path in the network, its reliability is dependent on the links and nodes along the path. It is common for many networks to provide some form of protection in the event of failure. For example, in the event of a link or node failure, the network can be adapted to switch data traffic around the failed element via a protection route.

The protection of traffic can be accomplished in several ways using the MPLS framework. Two ways that traffic can be protected using MPLS include recovery via LSP rerouting or via MPLS protection switching or rerouting actions.

The two basic models for path recovery include path rerouting and protection switching. Protection switching and rerouting may be used in combination. For example, protection switching provides a quick switchover to a recovery path for rapid restoration of connectivity while slower path rerouting determines a new optimal network configuration at a later time.

In recovery by path rerouting, new paths or path segments are established on demand for restoring traffic after the occurrence of a fault. The new paths may be chosen based upon fault information, network routing policies, pre-defined configurations and network topology information. Thus, upon detecting a fault, paths or path segments to bypass the fault are established using the signaling protocol or the NMS. Note that reroute mechanisms are inherently slower than protection switching mechanisms, since more processing and configuring must be done following the detection of a fault. The advantage of reroute mechanisms is that they are cheaper since no resources are committed until after the fault occurs and the location of the fault is detected. An additional advantage of reroute mechanisms is that the LSP paths they create are better optimized, and therefore consume less network resources.

Note also that once the network routing algorithms have converged after a fault, it may be preferable, to re-optimize the network by performing a reroute based on the current state of the network and network policies in place.

In contrast to path rerouting, protection switching recovery mechanisms pre-establish a recovery path or path segment, based on network routing policies and the restoration requirements of the traffic on the working path. Preferably, the recovery path is link and node disjoint with the working path. When a fault is detected, the protected traffic is switched over to the recovery path(s) and restored.

The resources (i.e. bandwidth, buffers, processing, etc.) on the recovery path may be used to carry either a copy of the working path traffic or extra traffic that is displaced when a protection switch occurs leading to two subtypes of protection switching. In the first, known as 1+1 protection, the resources (bandwidth, buffers, processing capacity) on the recovery path are fully reserved, and carry the same traffic as the working path. Selection between the traffic on the working and recovery paths is made at the path merge LSR (PML).

In the second, known as 1:1 protection, the resources (if any) allocated on the recovery path are fully available to low priority or excess information rate (EIR) traffic except when the recovery path is in use due to a fault on the working path. In other words, in 1:1 protection, the protected traffic normally travels only on the working path, and is switched to the recovery path only when the working path has a fault. Once the protection switch is initiated, the low priority or EIR traffic being carried on the recovery path is displaced by the protected traffic. This method affords a way to make efficient use of the recovery path resources.

An example of protection switching in MPLS networks is described below. Consider an example MPLS based network incorporating a bypass tunnel. The network comprises a plurality of label switched routers (LSRs) connected by links. Backup tunnels are established for protecting LSPs statically by the management station or using RSVP signaling. RSVP extensions for setting up protection tunnels have been defined. To meet the needs of real-time applications such as video on demand, voice over IP, etc., it is desirable to affect the repair of LSPs within tens of milliseconds. Protection switching can provide such repair times.

The LSPs can also be protected (i.e. backed up) using the label stacking capabilities of MPLS. Instead of creating a separate LSP for every backed-up LSP, a single LSP is created which serves to backup a set of tunnels. Such a tunnel is termed a bypass tunnel. The bypass tunnel itself is established just like any other LSP-based tunnel. The bypass tunnel must intersect the original tunnel(s) somewhere downstream of the point of local repair. Note that this implies that the set of tunnels being backed up all pass through a common downstream node. Candidates for this set of tunnels include all tunnels that pass through the point of local repair and through this common node which do not use the facilities being bypassed.

To repair the backed up tunnels, packets belonging to a failed tunnel are redirected onto the bypass tunnel. An additional label representing the bypass tunnel is stacked onto the redirected packets. At the last LSR of the bypass tunnel, the label for the bypass tunnel is popped off the stack, revealing the label that represents the tunnel being backed up. An alternative approach is to pop the bypass-tunnel label at the penultimate LSR of the bypass tunnel.

Virtual Local Area Networks (VLANs)

Local Area Networks (LANs) were originally defined as a network of computers located within the same area. Today, Local Area Networks are defined as a single broadcast domain whereby broadcasts from a user will be received by every other user on the LAN. Use of a router can prevent broadcast messages from leaving a LAN. The disadvantage of this method is that routers usually take more time to process incoming data compared to a bridge or a switch in addition to the fact that routers are more complicated to configure. More importantly, the formation of broadcast domains depends on the physical connection of the devices in the network. Virtual Local Area Networks (VLANs) were developed as an alternative solution to using routers to contain broadcast traffic.

A LAN can be logically segmented into different broadcast domains. Since it is a logical segmentation and not a physical one, workstations do not have to be physically located together. Users on different floors of the same building, or even in different buildings can now belong to the same LAN. VLANs also allow broadcast domains to be defined without using routers. Bridging software is used instead to define which workstations are to be included in the broadcast domain. Routers would only have to be used to communicate between two VLANs.

The behavior of VLANS are defined by the IEEE 802.1Q specification which defines a VLAN as a network of devices configured through software rather than hardware that behave as if they are connected to the same wire even though they may actually be physically located on different segments of a LAN. In a VLAN, when a computer is physically moved to another location, it can stay on the same VLAN without any physical reconfiguration (e.g., relocation of hardware) and without the need to change its IP address.

The advantages of VLANs include (1) increased performance since broadcast messages are not needlessly sent to every destination, (2) the ability to form virtual workgroups, (3) simplified administration since recabling, station addressing and reconfiguration of hubs is not necessary for adds, moves and changes, (4) reduced cost since a lower number of expensive routers is required, and (5) improved security by controlling broadcast domains and reducing chances of an outsider gaining access to data.

VLANs work by assigning a tag to the packet that uniquely identifies the packet as belonging to a particular VLAN. When a bridge receives data from a workstation, it tags the data with a VLAN identifier indicating the VLAN from which the data came. This is called explicit tagging. It is also possible to determine to which VLAN the data received belongs using implicit tagging. VLAN tags can be assigned based on several criteria such as the port from which it came, the source MAC address of the received packet or the protocol type of the received packet. The bridge maintains a mapping between VLAN IDs and the entity used for tagging such as port, MAC address, etc. For example, if tagging is by port, the database (called a filtering database) indicates which port belongs to which VLAN. When a packet is received on a port, the bridge makes a forwarding decision and adds the VLAN ID tag to the packet. A packet is sent out of a port only if that port is configured to forward the VLAN to which the packet belongs.

It is becoming increasingly common today to build networks from two or more subnetworks. As an example, consider a network that is built from two main parts: (1) a core network or transport portion, and (2) an edge network or access portion. Such networks are typically used by telecommunication carriers, for example, to provide one type of network to users for access purposes and to use a different type of network for transport of user data. In one common network configuration, the access or network edge portion is 802.1Q VLAN based and comprises edge switches that are adapted to handle VLAN tagged packets. Connections in the edge portion are provisioned using static VLAN configurations. The core portion comprises core switches that implement standard MPLS.

Protection, especially fast protection in the sub 50 millisecond range, in the core MPLS based network can be provided in several ways as outlined by the IETF, by the ITU and by the MEF. As described above, two types of protection include end-to-end protection and local protection. The former provides an alternative backup path in the event a failure occurs along the primary path. The latter provides protection at the core wherein each link (or possibly also each node, or each other resource, in accordance with the protection-tunnels deployed) is protected by a backup protection tunnel. In the event of a link failure, MPLS provides local protection to quickly restore traffic through the bypass protection tunnel.

Fast local protection in the VLAN based network edge portion, however, is also required in order to provide end-to-end connection protection. No efficient mechanism exists that can provide fast protection in VLAN based edge networks in both the local to remote and remote to local directions. Thus, there is a need for a fast protection mechanism that is capable of maintaining end-to-end and fast local protection, e.g., sub 50 milliseconds, for connections that are partially based on VLAN technology and partially on MPLS technology.

SUMMARY OF THE INVENTION

The present invention provides a fast protection mechanism capable of maintaining end-to-end and fast local protection, e.g., sub 50 milliseconds, for VLAN only based connections as well as for connections that are based partially on VLAN technology and partially on MPLS technology. The present invention is suitable for use in edge switches configured in a stack or ring topology. In a stack, a plurality of edge switches are connected to each other in linear fashion with the ends of the stack connected to core switches. In a ring topology, edge switches are connected together to form a ring that is not connected to any core switches.

Protected connections have associated with them two VLANs: a main and alternative VLAN. The protection mechanism requires the provisioning by the NMS of both main and alternative VLANs in each edge switch in the local and remote stack portions of the network. The end-to-end main and alternative paths may comprise VLAN based portions at one or both of its ends and possibly an MPLS-based portion in the middle. It is required that all parts of the two paths be provisioned a priori. Once provisioned, protected traffic can be restored in sub 50 ms in response to a link failure between two edge switches in the stack.

When a link failure occurs, the edge switches on either end of the failed link immediately switch all protected traffic going through that link to the alternative VLAN. If a connection starts at that particular edge switch, user traffic is now forwarded to the alternative VLAN over a link connected to the other network port. If the connection does not start at this particular edge switch, the edge switch sends the packets received from the operational network port back after first changing the packet's VLAN to the alternative VLAN. Hello messages are used to signal the remote edge switch that a failure has occurred and to start using the alternative VLAN.

In the local to remote direction, traffic is restored very rapidly once the link failure is detected. In the remote to local direction, protected traffic is restored very quickly by sending the returned packets through an MPLS bypass tunnel that connects the two core switches (or the two ports of the same core switch) connected to either end of the stack. Once packets reach the other end of the bypass tunnel, they are placed into the alternative VLAN where they are forwarded to the user.

It is important to also note that the invention is not limited by the type of network in use, the PHY layer, the type of protection paths used or by the type of signaling in use or by whether provisioning is based on signaling or performed in the management plane. Examples of applicable networks include, but are not limited to, Ethernet, MPLS and Private Network to Network Interface (PNNI) based Asynchronous Transfer Mode (ATM) networks.

Note that the invention is suitable for implementation in hardware such as a network processor (which may comprise a network-processor chip, an FPGA, an ASIC, etc.), adapted to implement the mechanism of the present invention, software or a combination of hardware and software. In one embodiment, a network device comprising a processor, memory, etc. is operative to execute software adapted to perform the fast protection mechanism of the present invention.

The fast connection protection mechanism of the present invention has been implemented and embodied in a commercially available product, the A-2100 Optical Ethernet Edge Switch manufactured by Atrica Inc., Santa Clara, Calif.

There is thus provided in accordance with the invention, a method of providing connection protection in a Virtual Local Area Network (VLAN) based stack, the method comprising the steps of provisioning a main VLAN for a connection between a local edge switch and a remote switch, provisioning an alternative VLAN for the connection on each edge switch in the stack, detecting failure of a link, if the connection begins on the edge switch that detected the failure, switching protected traffic destined for the failed link to the alternative VLAN in response to detection of the link failure and if the connection does not begin on the edge switch that detected the failure, changing packets received over a network port on the main VLAN to the alternative VLAN and returning the changed packets over the same network port they were received from.

There is also provided in accordance with the invention, a method of providing connection protection in a Virtual Local Area Network (VLAN) based stack, the method comprising the steps of provisioning a main VLAN for a connection between a local edge switch and a remote switch, provisioning an alternative VLAN for the connection on each edge switch in the stack, provisioning a Multiprotocol Label Switching (MPLS) bypass tunnel between opposite ends of the stack, detecting failure of a link, if the connection begins on the edge switch that detected the failure, switching protected traffic destined for the failed link to the alternative VLAN in response to detection of the link failure, if the connection does not begin on the edge switch that detected the failure, changing packets received over a network port on the main VLAN to the alternative VLAN and returning the changed packets over the same network port they were received from, forwarding the protected traffic via the bypass tunnel and upon reaching the end of the bypass tunnel, forwarding the protected traffic to the alternative VLAN.

There is further provided in accordance with the invention, a method of providing connection protection in a Virtual Local Area Network (VLAN) based stack, the method comprising the steps of provisioning a main VLAN for a connection between a local edge switch and a remote switch, provisioning an alternative VLAN for the connection, if the connection begins on the edge switch that detected a failure, switching protected traffic to the alternative VLAN, if the connection does not begin on the edge switch that detected the failure, changing packets received over a network port on the main VLAN to the alternative VLAN and returning the changed packets over the same network port they were received from, sending an Other Path Down (OPD) indication to a remote edge switch and switching protected user data to the alternative VLAN upon receipt of an OPD acknowledgement if the edge switch terminates the connection.

There is also provided in accordance with the invention, a packet processor for use in each edge switch in a Virtual Local Area Network (VLAN) based stack, each edge switch including a plurality of user ports and a plurality of network ports comprising means for maintaining the status of each link connected to the edge switch, means for maintaining a fast protection flag for each connection indicating whether, in the event of a link failure, packets received tagged with a main VLAN of the connection are to be returned over the network port on which they were received and means for tagging a received packet with an alternative VLAN in the event a link failure occurs and the received packet is for the main VLAN of a connection whereby the fast protection flag is set.

There is still further provided in accordance with the invention, a method of providing connection protection in a Virtual Local Area Network (VLAN) network for use on a Multiprotocol Label Switching (MPLS) based core switch, wherein a main and alternative VLAN is provisioned for a connection between a local edge switch and a remote edge switch, and wherein an MPLS bypass tunnel is provisioned between opposite ends of a stack to be protected, the method comprising the steps of detecting failure of a link, switching protected traffic destined for the failed link to the alternative VLAN in response to detection of the link failure and forwarding the protected traffic to the bypass tunnel.

There is also provided in accordance with the invention, an edge switch in a Virtual Local Area Network (VLAN) based stack comprising a plurality of user ports for interfacing the edge switch to one or more users, a plurality of network ports for interfacing the edge switch to one or more communication links, packet processing means operative to maintain the status of each link connected to the edge switch, maintain a fast protection flag for each connection indicating whether, in the event of a link failure, packets received tagged with a main VLAN of the connection are to be returned over the network port on which they were received and tag a received packet with an alternative VLAN in the event a link failure occurs and the received packet is for the main VLAN of a connection whereby the fast protection flag is set.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ASIC | Application Specific Integrated Circuit |
| ATM | Asynchronous Transfer Mode |
| CD-ROM | Compact Disc-Read Only Memory |
| CPU | Central Processing Unit |
| CR-LDP | Constraint-based Label Distribution Protocol |
| CSIX | Common Switch Interface |
| DAT | Digital Audio Tape |
| DSP | Digital Signal Processor |
| DVD | Digital Versatile Disk |
| EEPROM | Electrically Erasable Programmable Read Only Memory |
| EIR | Excess Information Rate |
| EPROM | Erasable Programmable Read Only Memory |
| FDDI | Fiber Distributed Data Interface |
| FIS | Failure Indication Signal |
| FPGA | Field Programmable Gate Array |
| GE | Gigabit Ethernet |
| IEEE | Institute of Electrical and Electronic Engineers |
| IETF | Internet Engineering Task Force |
| IP | Internet Protocol |
| ISIS | Intermediate System to Intermediate System |
| ITU | International Telecommunications Union |
| LAN | Local Area Network |
| LDP | Label Distribution Protocol |
| LSB | Least Significant Bit |
| LSP | Label Switched Path |
| LSR | Label Switching Router |
| MAC | Media Access Control |
| MEF | Metro Ethernet Forum |

-continued

| Term | Definition |
| --- | --- |
| MPLS | Multi-Protocol Label Switching |
| NIC | Network Interface Card |
| NMS | Network Management System |
| OAM | Operation Administration and Maintenance |
| OPD | Other Path Down |
| OSPF | Open Shortest Path First |
| OSPF-TE | Open Shortest Path First with Traffic Engineering |
| PDH | Plesiochronous Digital Hierarchy |
| PML | Path Merge LSR |
| PNNI | Private Network to Network Interface |
| PSL | Path Switch LSR |
| PVC | Permanent Virtual Circuit |
| RAM | Random Access Memory |
| ROM | Read Only Memory |
| RPR | Resilient Packet Ring |
| RSVP | Reservation Protocol |
| RSVP-TE | Reservation Protocol with Traffic Engineering extensions |
| SDH | Synchronous Digital Hierarchy |
| SONET | Synchronous Optical Network |

Definitions Used Throughout

The following terms and definitions apply throughout this document.

Rerouting is defined as a procedure for changing the route of a traffic path. Rerouting can serve as a recovery mechanism in which the broken path, the recovery path or segments of these paths are created dynamically after the detection of a fault on the working path. In other words, rerouting can serve as a recovery mechanism in which the recovery path is not pre-established. Rerouting can also serve as an optimization mechanism in which path routes are dynamically changed to ones that are better suited for current network conditions.

Protection switching is defined as a recovery mechanism in which the recovery path is created prior to the detection of a fault on the working path, path segment or network segment it protects. In other words, a recovery mechanism in which the recovery path is pre-established. Protection bandwidth is defined as bandwidth on a link reserved for protection purposes, e.g., protection tunnels, bypass tunnels, recovery path, detour paths and protection paths.

The working path is the protected path that carries traffic before the occurrence of a fault. The working path exists, in MPLS networks for example, between a PSL and PML. The working path can be of different kinds; a hop-by-hop routed path, a trunk, a link, an LSP, part of an LSP, a group of LSP parts or part of a multipoint-to-point LSP. The term primary path is a synonym for a working path. The active path is the path that is currently active, which may comprise the working (i.e. primary) path or the recovery (i.e. alternative or protection) path.

The recovery path is the path by which traffic is restored after the occurrence of a fault. In other words, the path on which the traffic is directed by the recovery mechanism. The recovery path may be established by MPLS means. The terms backup path, alternative path and protection path are synonyms for a recovery path.

A switchover is the process of switching the traffic from the path that the traffic is flowing on onto one or more alternate path(s). This may involve moving traffic from a working path onto one or more recovery paths, or may involve moving traffic from a recovery path(s) on to a more optimal working path(s). A switchback is the process of returning the traffic from one or more recovery paths back to the working path(s).

Revertive mode refers to a recovery mode in which traffic is automatically switched back from the recovery path to the original working path upon the restoration of the working path to a fault-free condition. This assumes a failed working path does not automatically surrender resources to the network. Non-revertive mode refers to a recovery mode in which traffic is not automatically switched back to the original working path after this path is restored to a fault-condition. Note that depending on the configuration, the original working path may, upon moving to a fault-free condition, become the recovery path, or it may be used for new working traffic, and no longer be associated with its original recovery path.

An MPLS protection domain refers to the set of LSRs over which a working path and its corresponding recovery path are routed. An MPLS protection plan refers to the set of all LSP protection paths and the mapping from working to protection paths deployed in an MPLS protection domain at a given time.

The term MPLS-based recovery refers to the ability to quickly and completely restore traffic lost due to a fault in an MPLS-network. The fault may be detected on the MPLS layer or in lower layers over which MPLS traffic is transported. The fastest MPLS recovery is typically achieved using protection switching. The MPLS LSR switchover time is comparable to the 50 ms switchover time of SONET.

DETAILED DESCRIPTION OF THE INVENTION

The present invention provides a fast protection mechanism capable of maintaining end-to-end and fast local protection, e.g., sub 50 milliseconds, for VLAN only based connections as well as for connections that are based partially on VLAN technology and partially on MPLS technology. The notification mechanism utilizes operation, administration and maintenance (OAM) packets to carry one or more flags to indicate to the other side of a connection that a link failure has occurred. Note that the terms Hello packet and Hello protocol as used in this document are intended to be synonymous with OAM packet and OAM protocol, respectively. End-to-end protection is typically slow (e.g., less than 10 seconds) while local protection is fast (e.g., sub 50 milliseconds). The mechanism thus provides fast local protection in the VLAN based edge portion of the network.

For illustration purposes, the principles of the present invention are described in the context of a network comprising a VLAN based access (or edge) portion and an MPLS based core portion. The VLAN based edge portion employs 802.1Q VLAN tagging and the MPLS core portion employs any suitable routing such as OSPF-TE and either signaling such as RSVP-TE signaling or management-plane based provisioning such as creation of PVCs using an NMS. An NMS is also required for proper provisioning of both the edge and core switches in the network. It is assumed that the NMS or other management entity has full access to all edge and core switches in the network.

It is intended that the mechanism of the present invention be implemented in VLAN based edge switches. It is not intended, however, that the invention be limited to the configurations and embodiments described herein. It is appreciated that one skilled in the networking, electrical and/or software arts may apply the principles of the present invention to numerous other types of networking devices and network configurations as well without departing from the spirit and scope of the invention.

Figure 1:
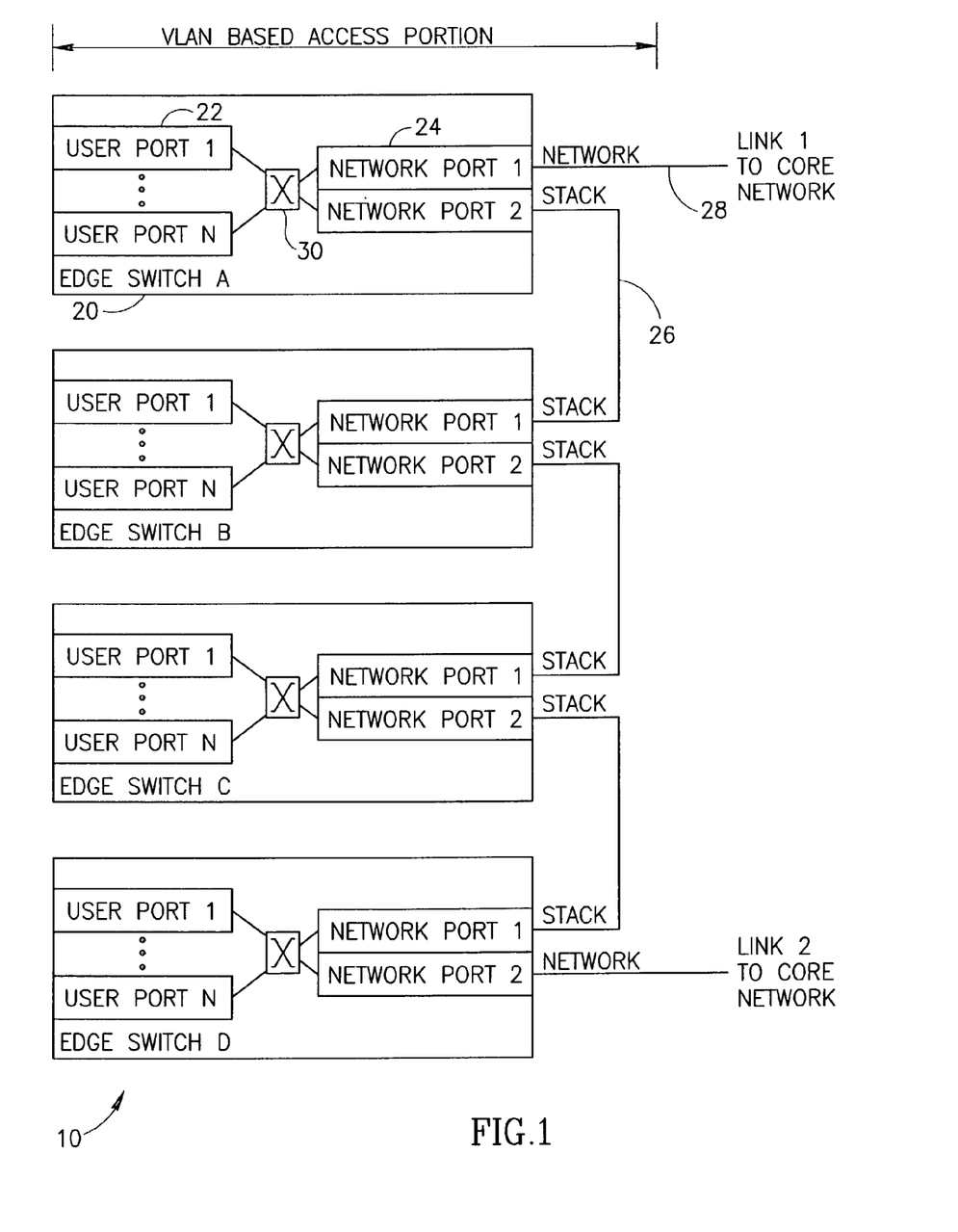
FIG. 1 is a diagram illustrating an example VLAN based stack comprising a plurality of edge switches.

A diagram illustrating an example VLAN based stack comprising a plurality of edge switches is shown in FIG. 1. The plurality of edge switches, generally referenced 10, illustrates the general model of a VLAN based stack. The stack is made up of a plurality of edge switches 20, labeled edge A, B, C and D, each of which comprises a plurality of user ports 22, labeled user port 1 through user port N, a switch 30 implemented such as by a network processor (or one or more FPGAs or ASICs), and a plurality of network ports 24. In this example, the edge switches comprise two network ports, labeled network port 1 and 2. The invention, however, contemplates edge switches having any number of user ports and at least two network ports.

Each edge switch is connected to two links 26, 28. Each switch within the stack is connected to the switch above and below it through the network ports. The switches on the two ends of the stack are connected to neighboring switches through one network port and to core switches through the other network port. The core switches may comprise, for example, A-8100 or A-8800 Optical Ethernet core switches manufactured by Atrica Inc., Santa Clara, Calif. The core switches are MPLS based switches that use MPLS technology at their core ports for connection to neighboring core switches and use VLAN technology at their network edge ports that are the ports to which the end edge switches in the stack are connected. It is important to note that the invention is applicable to topologies wherein the stack comprises a ring architecture made up of several edge switches connected to each other. The ends of the stack may be connected to each other thus forming a ring and are not necessarily connected to core switches. Alternatively, only one end of the stack may be connected to a core switch but in this case, no redundancy is provided.

Each edge switch within the stack is capable or sending packets to both network ports. This capability enables different connections to be made through different links (i.e. link 1 or link 2) and therefore better utilize network resources. Note that the edge switches within the same stack may be in close proximity or may be far apart from each other. For example, each switch may be located in a different multi-tenant dwelling or in different cities or towns. The links between the stacks comprise optical links and need to be protected from failures. The protection mechanism of the present invention provide fast protection for these links.

An end-to-end connection protection mechanism is required in order to overcome failures in the network in such a way that connections and tunnels remain operable even after a link has failed in the network. This is achieved by establishing two paths for each protected point-to-point connection: (1) a main or working path and (2) a backup or alternative path. At any given time only one of the two paths is used while the other path serves as a protection path to be used in the event of a failure.

The discovery of a path failure is performed by a Hello protocol that is executed by the edge switches at both ends of the path. The Hello protocol involves sending Hello packets along the path in both directions in order to monitor the health of the path. This requires that either a bidirectional path or two unidirectional paths going in reverse directions be used.

Figure 2:
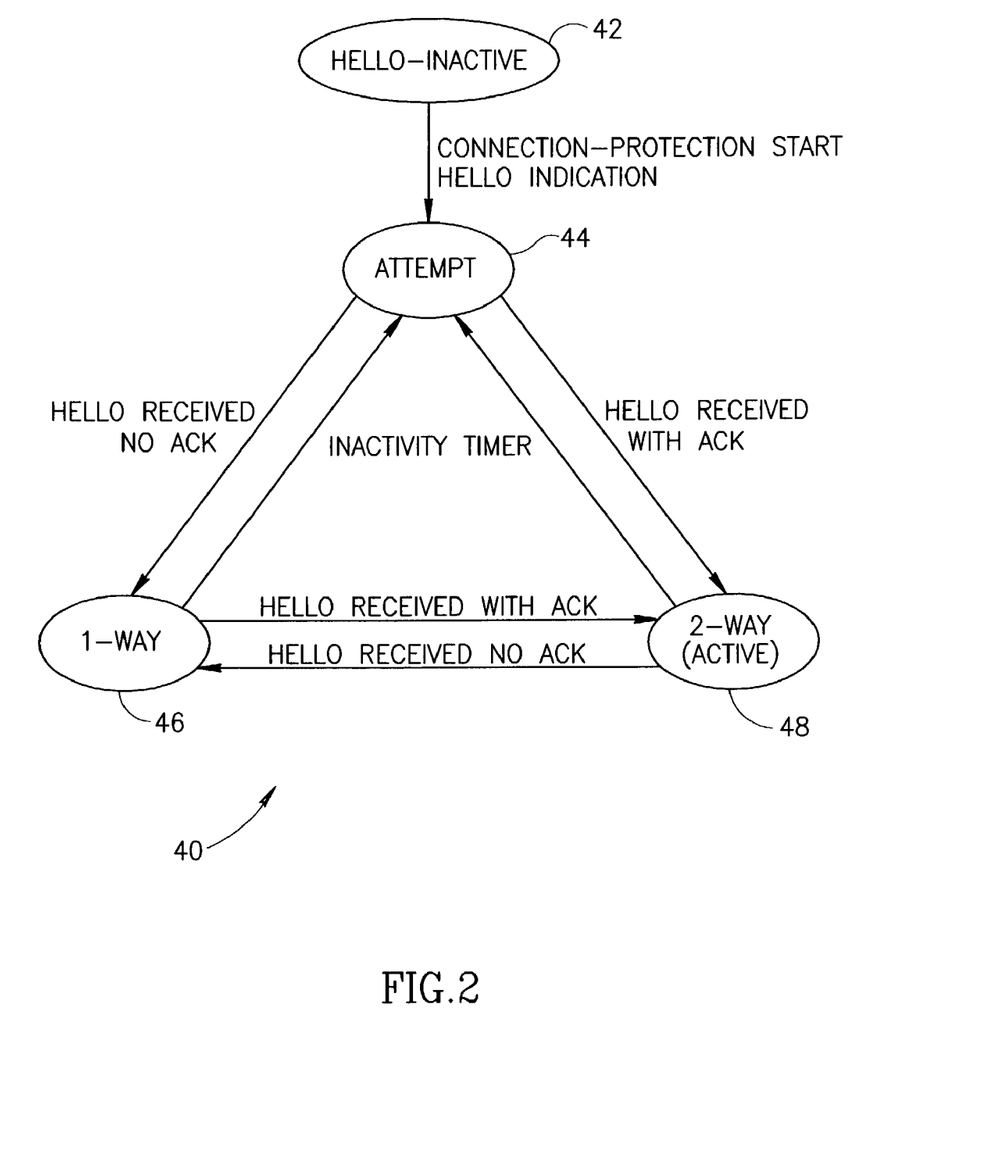
FIG. 2 is a state diagram illustrating the Hello protocol mechanism used to discover path failures in the network.

A state diagram illustrating the Hello protocol mechanism used to discover path failures in the network is shown in FIG. 2. The OAM state transition diagram, generally referenced 40, comprises four states including Hello-Inactive 42, Attempt 44, 1-Way 46 and 2-Way 48. At every HelloInterval (configurable with default at one second), the device at which the tunnel starts sends a Hello packet along the path to its peer device at the other end of the tunnel. Every Hello packet comprises a flags field, which includes an acknowledge bit. As long as a device does not receive Hello packets from the other side, it stays in the 'Attempt' state in which the device attempts to create the connection through that path with no success thus far. In addition, the device contains an inactivity timer for each path. The timer is reset each time a Hello packet is received on that path. When the timer approaches the value of InactivityFactor times HelloInterval, it causes the state machine to move to the 'Attempt' state, meaning that the path has failed. The default value of InactivityFactor is 4.

The acknowledge bit is set to 0 if the Hello message (i.e. Hello packet) currently received does not acknowledge any previously received Hello message. Hello messages with the acknowledge bit set to 0 are sent only when in the 'Attempt' state, i.e. after not receiving Hello messages from the other side in the last 'InactivityFactor' times 'HelloInterval' period. When in the 1-Way or 2-Way state, Hello packets are sent with the acknowledge bit set. Upon receiving a Hello message with the acknowledge bit cleared, the device changes the state of the path to '1-Way', meaning that it received Hello messages but its own Hello messages have not been acknowledged. In this state, the path is still considered failed.

Upon receiving a Hello message with the acknowledge bit set, the device changes the state of the path to '2-Way', meaning that it received Hello messages acknowledging the fact that its own Hello messages were received on the other side. The end-to-end protection scheme implemented in the nodes uses the Hello protocol in the following way: as long as the main path is not in the 'failed' state, it is used. When the main path fails, the protection path replaces it and the Hello protocol is executed on both paths.

A first-hop link for a specific connection is defined as a network link directly connected to a device (e.g., an edge switch), which is also serves as one of the end points of the connection to which the user is attached. The first hop links are handled like any other link. Resiliency in the event of a link failure is achieved by implementing connection protection. Both links to the edge switch are always active, unless one of them fails. During provisioning, the connection manager via the NMS creates two VLAN paths for every protected connection. The two VLAN paths are created such that each goes out of the edge switch through a different link. When the link through which the main VLAN path passes fails, the alternative VLAN path becomes active.

In order to accelerate the response time in the event of a link failure, the edge switch moves all connections currently using the failed link to their corresponding alternative VLAN paths without waiting for the Hello protocol to detect the connection failure. The edge switch immediately generates and sends a Hello message over the alternative VLAN path of each of these connections with a special indication that the link at the other path does not work. The special indication comprises a flag called Other Path Down (OPD). Upon receiving such a Hello message, the edge switch at the other end of the connection immediately begins to use the alternative VLAN path as well. After fast protection is achieved, the connection behaves as a regular connection operating in the protection state, meaning that it returns to the main path only after the main path is operational for a reversion period of time.

Consider the case when a connection is currently using the protection VLAN path although the main VLAN path has been returned to the operational state. This means that this connection is within its reversion timeout period. Now assume that the network link of the edge switch through which the protection path flows fails. In this case, the packet processing engine in the switch immediately switches the ingress traffic to the main VLAN path. The switch then sends a Hello message over the main VLAN path of the connection with a special indication that the link at the other end of the path is down. In response to receiving this Hello message, the edge switch at the other end of the connection immediately starts using the main VLAN path as well.

The fast protection mechanism of the present invention provides the capability to perform local-protection in sub-50 mSec in a VLAN-based environment as well as in a mixed MPLS and VLAN environment, in which VLAN based rings or stacks of carrier edge switches are connected to MPLS based core networks. The mechanism of the present invention comprises the ability to provide protection in both the local to remote and remote to local directions. Both are described in detail infra.

Sub 50 ms Protection in the Local to Remote Direction

Figure 3:
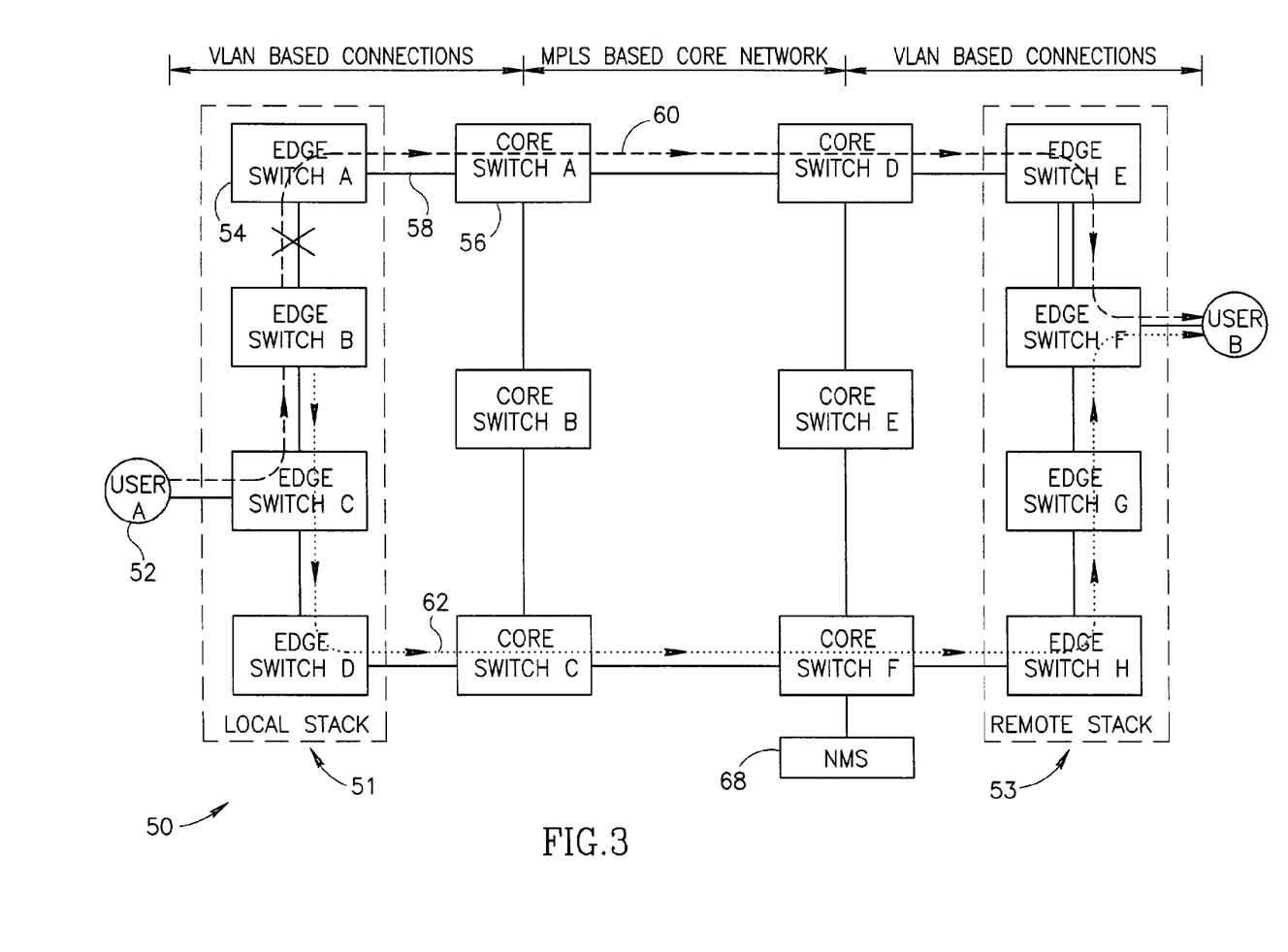
FIG. 3 is a first block diagram illustrating local to remote protection in an example network including VLAN based local and remote stacks and MPLS core network.

A first block diagram illustrating local to remote protection in an example network including VLAN based local and remote stacks and MPLS core network is shown in FIG. 3. The example network, generally referenced 50, is divided into two portions: a VLAN based access portion (i.e. edge stack) and an MPLS based core portion. In this example, two VLAN based access portions are located on either side of the core portion. Note, however, that the fast protection mechanism of the present invention is applicable to networks that comprise only edge switches configured such as in a ring topology.

The network 50 comprises two stacks: a local stack 51 and a remote stack 53. The MPLS based core is situated between them and connected to an NMS 68. The core switch section comprises core switches 56, labeled core switch A, B, C, D, E and F. The local stack comprises four edge switches 54 labeled edge switch A, B, C and D. The remote stack comprises four edge switches labeled edge Switch E, F, G and H. Two users 52 are shown, labeled user A and user B whereby user A is connected to edge switch C in the local stack and user B is connected to edge switch F in the remote stack. Links 58 connect the core switches, edge switches, users and NMS. Each edge switch comprises multiple user ports and two network ports. Note that the invention is not limited to edge switches comprising two network ports. Edge switches comprising a higher number of network ports is also contemplated.

In accordance with the invention, a protected connection requires two VLAN paths to be configured, each passing in opposite directions through the stack. The NMS is adapted to configure the VLANs of the connection as follows. Two VLAN paths including both main and alternative are configured for each connection wherein one path is provisioned towards the core switch on one end of the stack and the other path is provisioned towards the core switch at the other end of the stack. In the event of a link failure, protected traffic is switched to the alternative path.

The two paths continue towards the destination in one of the following ways:

1. A path may continue through the core network along links that connect core switches or other MPLS label switching routers (LSRs). The links between core switches use MPLS as the tunneling technology. The connection ends at a core switch.
2. The path may continue through in the core network and then continue through another stack (one or more) of edge switches.
3. The path may be forwarded to another stack by the core switch to which the local stack connects.
4. The two end-points of the connection may lie within the same stack. In this case, one path travels along links of the stack while the other path travels through the core network from one side of the stack to the other side of the same stack.
5. In a stand alone stack environment, the stack is connected in a ring-topology and the two paths simply go in different directions along the stack.

The connection protection mechanism is operative such that traffic flowing in the active (i.e. main) path is restored in sub 10 seconds once the failure is discovered by the Hello protocol. A failure in one of the two network port links connected directly to the edge switch terminating the connection is restored in sub 50 ms in the local-to-remote direction and in sub 2 seconds in the remote-to-local direction. Restoration in this case is achieved quickly since the edge switch terminating the connection is the one that senses the link failure. Protected traffic flowing in the local-to-remote direction can be restored in the event of failures of other links in the stack also in sub 50 ms time range using the fast protection mechanism of the present invention.

With reference to the example network of FIG. 3, assume we have a stack with edge switches A, B, C and D. Assume that a protected connection starts at edge switch C. If the link B–C fails (i.e. the link connecting edge switches B and C), edge switch C reacts in sub 50 ms and switches the local-to-remote traffic to the protection VLAN for that connection. Under the prior art, if link A–B fails, edge switch C will sense the failure only after sub 10 seconds and then switch to the protection VLAN of the connection. The present invention, however, provides a mechanism whereby local-to-remote traffic is rerouted to the protection VLAN in sub 50 ms time frame.

In accordance with the invention, the alternative VLAN is provisioned in each of the edge switches within the stack and not only on the path between the edge switch that terminates the connection and the core-switch at one side of the stack. The main path is provisioned as normal. The alternative path, however, is provisioned in all edge switches in the stack. The NMS thus is adapted to properly provision the alternative VLAN in each edge switch of the stack. In addition to provisioning, the egress packet processor (i.e. the packet processor that processes packets received over the network ports) in each edge switch is modified along with the associated embedded software to perform the fast protection mechanism of the present invention to achieve sub 50 ms protection.

In operation, when a link failure occurs, the edge switches on either end of the failed link immediately switch all protected traffic going through that link to the alternative VLAN. If a connection starts at that particular edge switch, user traffic is now forwarded to the alternative VLAN over a link connected to the other network port (or a different network port if three or more are present). If the connection does not start at this particular edge switch, the edge switch sends the packets received from the operational network port back after first changing the packet's VLAN to the alternative VLAN.

This is illustrated in the following example. With reference to FIG. 3, assume that a connection starts is edge switch C. Assume it is protected and that the main path VLAN is as indicated by the dashed line 60 and the alternative path VLAN is indicated by the dotted line 62. Absent a link failure, edge switch C sends packets to the main VLAN. Now assume that the link between edge switch A and edge switch B fails. Edge switch B moves to link protection mode whereby for each packet received from the link between C and B and having a main-path VLAN-ID, it changes the VLAN to the alternative VLAN and sends the packet back over the same link it was received on. This is actually the alternative VLAN of the connection. The packet continues to travel through edge switch C along the way to the other end of the connection through the alternative VLAN.

The Hello messages are used to signal the edge switch at the other end of the connection to switch to the alternative VLAN. This is achieved by the edge switch B checking the packets that are returned for Hello packets. If the packet is a Hello packet, the edge switch sets the OPD flag (a bit in the flags field of the Hello packet) in the packet before sending it back on the alternative VLAN as described above. The OPD flag instructs the other side to switch to the alternative VLAN. When this Hello message arrives at the far side edge switch, it immediately switches to the alternative VLAN. The remote edge switch may also be a core switch with a user-edge port (i.e. a port connected to a user).

In addition to switching to the alternative VLAN, the edge switch at the far end of the connection also sends a Hello message with the OPD acknowledge flag set. This Hello message is ultimately received by the edge switch terminating the connection at the local side that, in response thereto, switches to the alternative VLAN. Once this happens, the edge switches at both ends of the connection now use only the alternative VLAN. The time frame for the local-to-remote traffic to switch to the alternative VLAN is on the order of sub 50 ms. The far side, however, does not switch the remote-to-local traffic to the alternative VLAN until receipt of the Hello message with the OPD flag set that could take on the order of 1–2 seconds.

In accordance with the invention, the operation of switching to the alternative VLAN is simplified by configuring the main and alternative VLAN IDs to differ in only a single bit, such as the LSB. This simplifies the hardware in the packet processing engine and permits rapid switching of VLANs. Thus, the main VLANs are assigned VLAN IDs whose least significant bit (LSB) is '0' while alternative VLANs are assigned VLAN IDs whose least significant bit (LSB) is '1'. This allows the packet processing engine to simply set the LSB of the VLAN tag to switch to the alternative VLAN for a protected connection.

If the edge switches comprise more than two network ports, the connection tables in the switch may have entries that include both an alternative output port and an alternative VLAN in the event a failure is detected. A simple scheme is to have the packet return to the same port from which it came along the path back to the originating switch.

Note that when forwarding packets of the connection to the alternative VLAN, the edge switch terminating the connection continues sending Hello packets along the main VLAN as well as along the alternative VLAN. The Hello packets sent along the main path are ultimately switched to the alternative path by the protection scheme described above. This means that the edge switch at the other end of the connection receives two Hello packets from the alternative VLAN each HelloInterval.

Note also that packets received from the far side in the main VLAN are also returned back, this time by edge switch A in the example, towards the core switch A. Upon reaching core switch A, however, these packets are silently dropped if the remote to local portion of the protection mechanism of the present invention is not implemented. Packets are dropped only in the first 1–2 seconds after the link failure, since the edge switch on the other side will switch to the alternative VLAN within that time.

Note further that, to prevent the formation of loops, packets of alternative VLANs should not be sent back by the edge switch that sensed the link failure. This prevents loops from forming, such that in the case of two link failures packets do not travel back and forth between the two failure points.

In addition, the edge switch terminating the connection must be specially provisioned such that if a packet tagged with the alternative VLAN of the connection is received over a network port corresponding to the alternative path, it is forwarded to the user. In the example of FIG. 3, packets of the alternative path of the illustrated connection, received from edge switch D are forwarded to the user since they are received over a network port associated with the alternative path. If packets tagged with the alternative VLAN of the connection are received over a network port corresponding to the main path, they are forwarded to the network port of the alternative path. Thus, packets of the alternative path of the illustrated connection, received at edge switch C that are returned from edge switch B are forwarded to the network port connected to link C–D.

Figure 4:
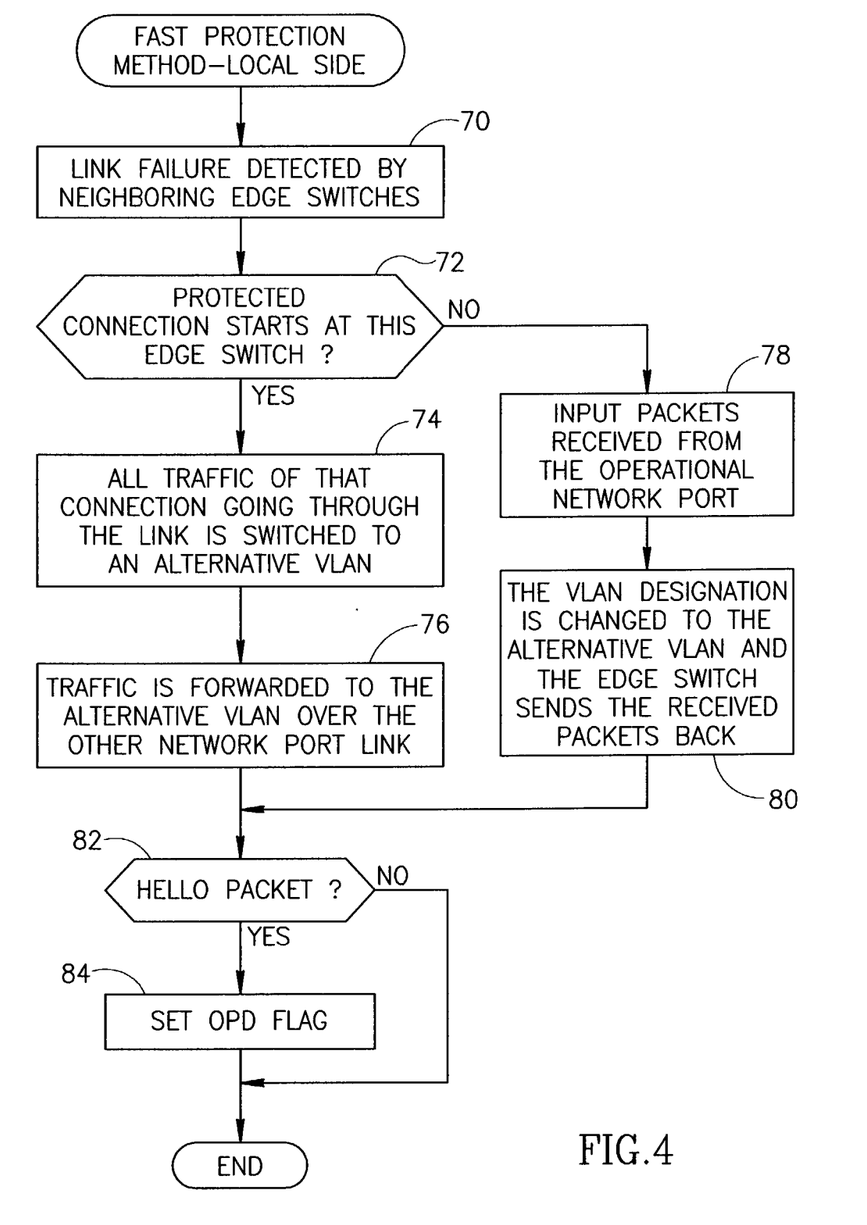
FIG. 4 is a flow diagram illustrating the local side portion of the fast protection mechanism of the present invention.

A flow diagram illustrating the local side portion of the fast protection mechanism of the present invention is shown in FIG. 4. For the protection mechanism to work properly, it is assumed that the main and alternative VLANs are properly provisioned in the edge switches in both stacks. When a link failure occurs, it is detected in the two edge switches on either side of the failure (step 70). If a protected connection starts at this edge switch (step 72), the VLAN tag of all traffic of that connection going through the link is switched to an alternative VLAN (step 74). The traffic is than forwarded to the alternative VLAN over the other link via its network port (step 76).

If the connection does not start at this edge switch (step 72), input packets are received over the operational network port (step 78). The edge switch then changes the VLAN to the alternative VLAN and sends the received packet back out the link it was received on (step 80). If the packet is a Hello packet (step 82), the OPD flag is set and the Hello packet is forwarded to the alternative VLAN (step 84).

Figure 5:
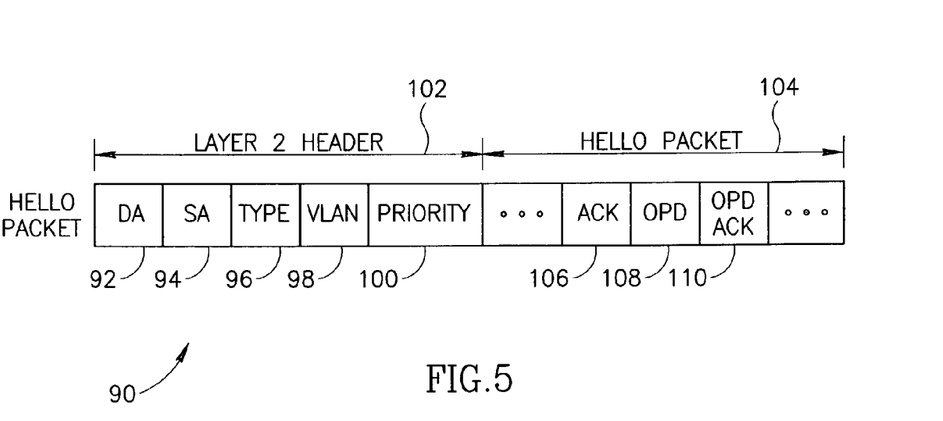
FIG. 5 is a diagram illustrating the format of the Hello packet including the flags field.

A diagram illustrating the format of the Hello packet including the flags field is shown in FIG. 5. The Hello packet, generally referenced 90, comprises a conventional Layer 2 Ethernet header 102 comprising destination address field 92, source address field 94, type 96, VLAN ID field 98 and priority field 100. The packet also comprises a Hello message portion comprising a flags field 104 and other Hello related fields. The flags field comprises an acknowledge bit 106, an Other Path Down (OPD) flag bit 108 and an OPD acknowledgement flag bit 110.

Figure 6:
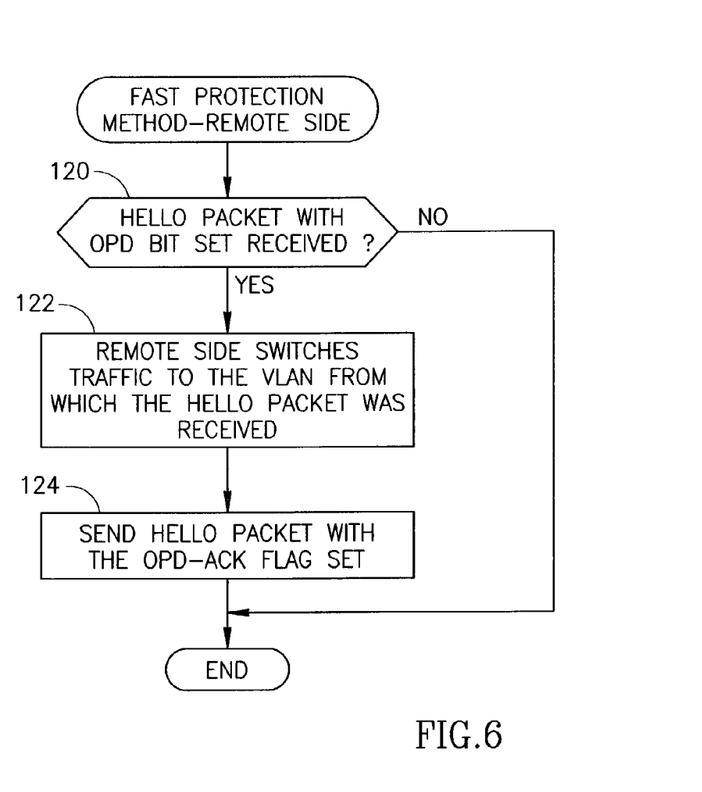
FIG. 6 is a flow diagram illustrating the remote side portion of the fast protection mechanism of the present invention.

A flow diagram illustrating the remote side portion of the fast protection mechanism of the present invention is shown in FIG. 6. The Hello packet is returned by the edge switch adjacent the failure to the alternative VLAN. The edge switch on the remote side checks incoming packets for Hello packets. When the Hello packet with the OPD bit set is received (step 120), the remote edge switch immediately switches traffic to the VLAN from which the Hello packet was received (unless it is already using it) (step 122) and returns the Hello packet with the OPD acknowledgement flag set (step 124). When received by the local edge switch terminating the connection, the traffic is switched to the alternative VLAN.

Sub 50 ms Protection in the Remote to Local Direction

As described previously, absent any special provisioning in the core portion of the network, packets sent along the main VLAN are sent back by edge switch A over the alternative VLAN. When they reach the core switch A, they are dropped since the core switch is not provisioned with the alternative VLAN. In order to prevent the packets from being dropped, the present invention implements a bypass tunnel between the two core switches to which the stack is connected. If the stack is connected to different ports of same switch, the tunnel is established between the relevant two ports of the switch. Note that this may be a conceptual tunnel implemented by the switch. This serves to protect the traffic in the remote to local direction.

Figure 7:
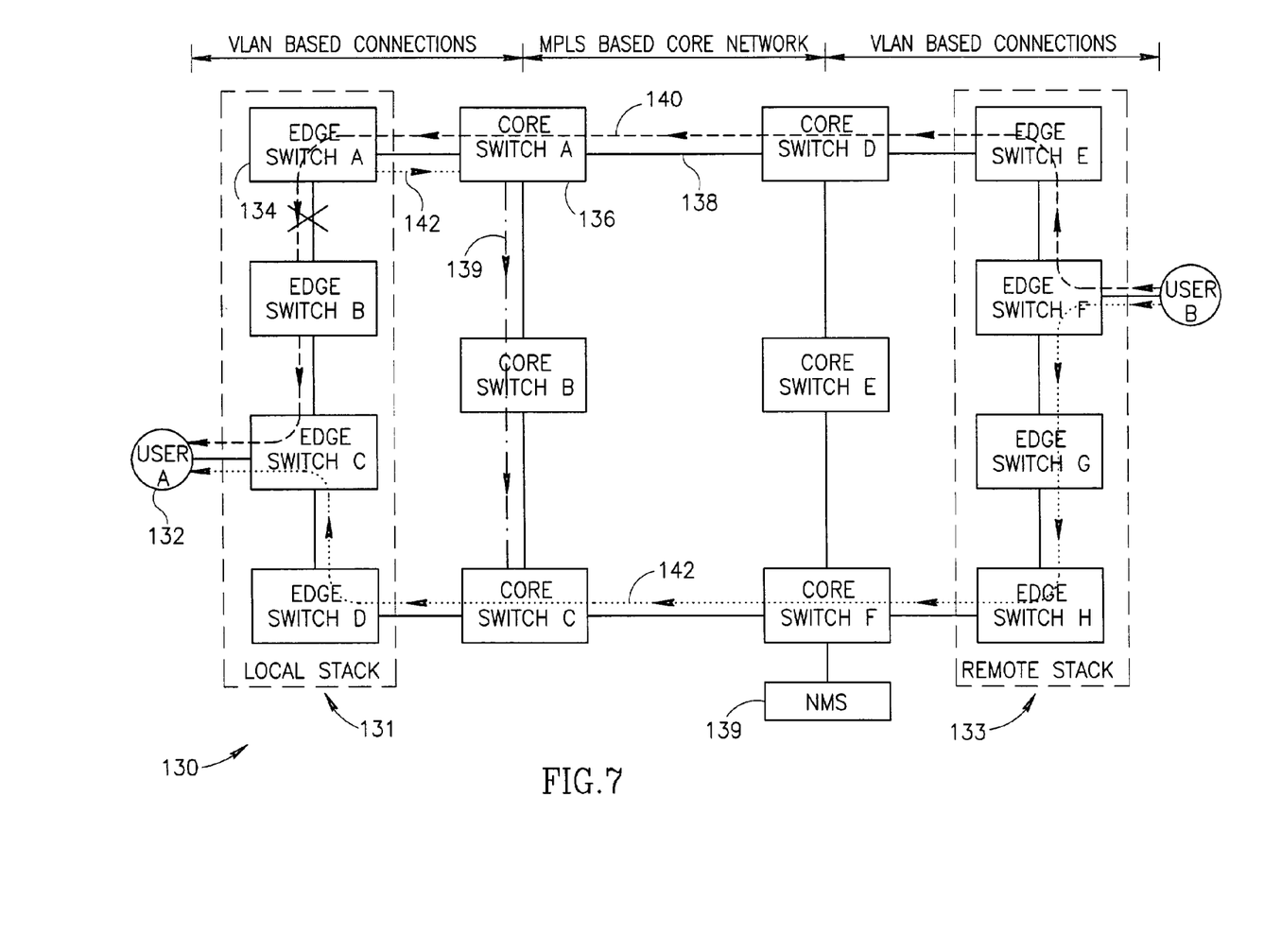
FIG. 7 is a second block diagram illustrating remote to local protection in an example network including VLAN based local and remote stacks and MPLS core network.

A second block diagram illustrating remote to local protection in an example network including VLAN based local and remote stacks and MPLS core network is shown in FIG. 7. The example network, generally referenced 130, is divided into two portions: a VLAN based access portion (i.e. edge stack) and an MPLS based core portion. The network comprises two stacks: a local stack 131 and a remote stack 133. The MPLS based core is situated between them and connected to an NMS 139. The core switch section comprises core switches 136, labeled core switch A, B, C, D, E and F. The local stack comprises four edge switches 134 labeled edge switch A, B, C and D. The remote stack comprises four edge switches labeled edge switch E, F, G and H. Two users 132, labeled user A and user B are connected to edge switch C in the local stack and to edge switch F in the remote stack, respectively. Links 138 connect the core switches, edge switches, users and NMS.

The main VLAN path is indicated by dashed line 140 and the alternative VLAN path is indicated by dotted line 142. Beforehand, as described above, a bypass tunnel is created between core switch A and core switch C as indicated by the dashed-dotted line 139. All packets received over the alternative VLAN are forwarded over this bypass tunnel. Another bypass tunnel in the reverse direction (from core switch C to core switch A) is created for dealing with connections for which the main path flows through the core switch C to the stack.

In operation, packets are sent from the remote side to the local side of the connection and are forwarded along the main path. The packets are forwarded from the remote side to the core section and then to the local stack. They continue along the local stack until reaching the failed link. Since the link between edge switch A and edge switch B failed, both edge switch A and B move to link protection mode. In this mode edge switch A returns each packet received in the main VLAN after changing its VLAN to the alternative VLAN associated with the connection. When reaching core switch A, since the packets are of the alternative VLAN, which are received from the main-path direction, they are inserted to the bypass tunnel which is an MPLS tunnel between the two core switches at the two sides of the local stack. This is achieved by adding an MPLS header and an additional MAC header to the packet. Upon reaching the end of the bypass tunnel, the packets are forwarded towards the local stack on the alternative VLAN 142. The packets now, however, enter the local stack from the direction of the alternative path and when reaching edge switch C, are forwarded to the user.

Thus, the protection mechanism of the present invention is operative to eliminate the 1–2 second loss of data that would otherwise occur without the benefit of the invention until the remote edge switch receives the Hello packet with the OPD flag set. With the invention, protected traffic is immediately rerouted to the alternative VLAN.

With reference to FIG. 7, in the case where the link between core switch A and edge switch A fails, the burden falls on core switch A to provide both VLAN and MPLS based protection in order to achieve sub 50 ms traffic restoration in the remote to local direction. Specifically, core switch A is adapted to (1) change the VLAN of all protected main path traffic to the respective alternative VLAN and (2) place the packets of the protected traffic on the bypass tunnel.

Packet Processor Engine Modifications

As stated supra, the fast protection mechanism of the present invention provides fast protection in the event of link failures in the stack. Modifications are required in the edge switches in order to implement the mechanism. An example embodiment illustrating the modifications required in the egress packet processing engine of the edge switch is presented below.

The egress packet processing engine comprises a link status register in which the software (or hardware) maintains the status of each of the network links. Each connection has an associated fast protection flag indicating whether packets received by the egress packet processing engine that are tagged with the main VLAN of the connection should be returned back when the other link fails. When one of the links has failed and a packet is received by the egress packet processing engine on a main VLAN of a connection for which the fast protection flag is set, the egress packet processing engine sets the least significant bit of the VLAN of the packet and sends it back to the network port on which the packet was received. Note that setting the LSB of the VLAN provides rapid VLAN switching. Alternatively, the packet processing engine or the software can provide the alternative VLAN from a lookup table or other storage means.

When one of the links has failed and a packet is received by the egress packet processing engine on a main VLAN of a connection for which the fast protection flag is not set, the egress packet processing engine silently drops the packet. Note that if the other link is operational, the egress packet processing engine functions as normal.

Each connection has associated with it a change hello packets flag indicating whether the egress packet processing engine should set the OPD flag in the flags field of Hello messages that are returned back. When one of the links has failed and a Hello packet is received by the egress packet processing engine on a main VLAN of a connection for which both the fast protection flag and the change hello packets flag is set, the egress packet processing engine sets the LSB of the VLAN of the packet and the OPD flag in the Hello flags field of the packet and sends it back out on the port it was received on. All non-Hello packets are treated identically when returned back due to a failed link wherein the LSB of the VLAN is set and the packet is returned. This is done regardless of whether it is a special packet or not.

For each protected connection terminating at the local switch, the destination of the packet of the alternative VLAN is set according to the port from which the packet was received. Packets of the alternative VLAN are sent to the user port when received over one network port and are sent along the stack when received from the other network port. This is required only in the edge switch terminating the connection. When packets are forwarded along the stack due to coming from the 'wrong' direction in the alternative VLAN they should be forwarded unchanged to the other network-port.

Network Device Embodiment

A network device can be adapted to implement the fast protection mechanism of the present invention. Hardware means and/or software means adapted to execute the mechanism may be incorporated within a network device such as an access edge switch, Network Management System, Label Switching Router (LSR), network switch or any other wired or wireless network device. The device may be constructed using any combination of hardware and/or software.

Figure 8:
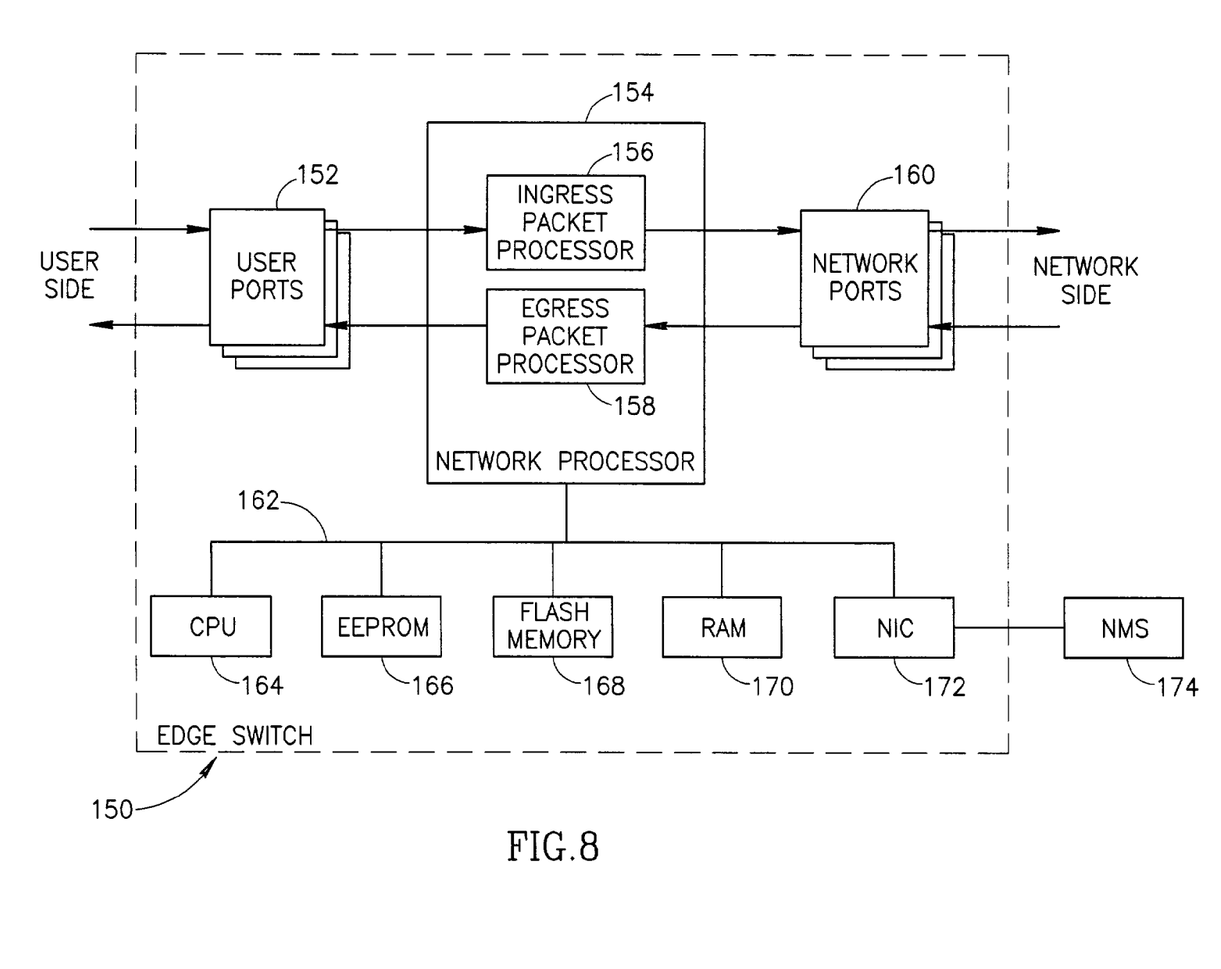
FIG. 8 is a block diagram illustrating an example edge switch incorporating the fast connection protection mechanism of the present invention.

A block diagram illustrating an example edge switch incorporating the fast connection protection mechanism of the present invention is shown in FIG. 8. The network device, generally referenced 150, comprises at its core a network processor 154, one or more user ports 152 and two or more network ports 160, a network interface 172 for interfacing the edge switch to an NMS 174, a central processor 164, e.g., CPU, and both volatile and non-volatile memory including RAM memory 170 for storing data and application program code, Flash memory 168 for storing boot and application code and EEPROM 166 for storing configuration data. The CPU communicates to the network processor, memory peripherals and other support devices via a bus 162.

The edge switch comprises a user side and a network side. The user side interfaces to the user via any suitable type of interface, e.g., Gigabit Ethernet (GE), Fast Ethernet (FE), PDH interface (e.g., T1/E1), etc. Likewise, the network side interfaces to other edge switches or the core network via any suitable interface such as Optical Ethernet (e.g., 1GE, 10GE, etc.), TDM, etc. A plurality of edge switches may be connected to each other as in FIG. 1 to form a stack whereby the edge switches at the ends of the stack are connected to core switches. In this case, connections are built using both VLAN and MPLS based technology. Alternatively, the network may comprise only edge switches whereby a plurality of edge switches are connected in a ring topology.

The network processor implements the switching fabric for providing the switching functionality of the device. Depending on the specific implementation, the switching fabric may comprise, for example, hardware for performing VLAN tagging, MPLS, Frame Relay, ATM switching, CSIX or any other fabric to network interface protocol. The network processor includes a packet processing engine that comprises an ingress packet processor 156 and an egress packet processor 158. The network processor also comprises timestamp circuits, clock circuits, memory, counters and CPU interface (not shown). The egress packet processor is adapted to implement the protection mechanism of the present invention as described hereinabove. The network processor may be implemented as a microcontroller, microprocessor, microcomputer, ASIC core, FPGA core, central processing unit (CPU) or digital signal processor (DSP) or any other suitable computing means. The edge switch comprises a NIC 172 for providing an out of band interface for connecting to external entities such as a craft for local maintenance and configuration purposes, a NMS for centralized provisioning, administration and control or a Local Area Network (LAN). The edge switch may comprise additional interfaces, such as a serial interface for connecting to a PC for configuration purposes.

The central processor 164 implements the major functionality of the edge switch. In particular, the central processor comprises means for performing Hello (or availability) protocol processing (part of this capability may reside in the network-processor as well). Note that the central processor may be implemented in any suitable manner such as a microcontroller, microprocessor, microcomputer, ASIC core, FPGA core, central processing unit (CPU) or digital signal processor (DSP) or any other computing means.

The user ports and network ports may be implemented on one or more line interface cards that provide the PHY interface to bidirectional communication links, optionally to the MAC interface and part of the switching fabric as well. Note that the invention is not limited to any particular line interface type or link speed. In addition, the invention is not limited to any particular number of user or network ports, as any number of links of each type may be used. Further, the line interface cards may be adapted to interface to any type of communication links such as any variety of copper or optical based Ethernet, Token Ring, FDDI, SONET/SDH, PDH, ATM, RPR, etc.

The network device also comprises an optional user interface adapted to respond to user inputs and provide feedback and other status information. A host interface (not shown) enables communication with a host computing device. The host may be adapted to configure, control and maintain the operation of the device. The device may also comprise magnetic storage device means for storing application programs and data.

The network device comprises computer readable storage medium which may include any suitable memory means including but not limited to magnetic storage, optical storage, CD-ROM drive, ZIP drive, DVD drive, DAT cassette, semiconductor based volatile or non-volatile memory, biological memory devices, or any other memory storage device.

Software operative to implement the functionality of the fast protection mechanism of the present invention is adapted to reside on a computer readable medium, such as a magnetic disk within a disk drive unit or any other volatile or nonvolatile memory. Alternatively, the computer readable medium may comprise a floppy disk, Flash memory, EPROM, EEPROM based memory, bubble memory storage, ROM storage, etc. The software adapted to perform the fast protection mechanism of the present invention or any portion thereof may also reside, in whole or in part, in the static or dynamic main memories or in firmware within the processor of the edge switch (i.e. within microcontroller, microprocessor, microcomputer, DSP, etc. internal memory).

In alternative embodiments, the methods of the present invention may be applicable to implementations of the invention in integrated circuits, field programmable gate arrays (FPGAs), chip sets or application specific integrated circuits (ASICs), DSP circuits, wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of providing connection protection in a Virtual Local Area Network (VLAN) based local edge stack, said method comprising the steps of:
provisioning a main VLAN for a connection between a local edge switch and a remote switch;
provisioning an alternative VLAN for said connection in each edge switch in said stack;
switching, at edge switches on either side of a detected failed link, all protected traffic going through said failed link to said alternative VLAN, wherein if said connection begins on an edge switch that detected said link failure, switching protected traffic destined for said failed link to said alternative VLAN in response to detection of said link failure, and wherein if said connection does not begin on an edge switch that detected said link failure, modifying packets received over a network port on said main VLAN to said alternative VLAN and returning said modified packets over the same network port they were received over; and
setting a flag in Hello packets on the edge switch that detected said failure before forwarding to said alternative VLAN, said flag for informing an edge switch at an opposite end of said connection to switch to said alternative VLAN.

2. The method according to claim 1, wherein said step of setting comprises the step of detecting Hello packets in the edge switch that detected the failure, setting an Other Path Down (OPD) flag in said Hello packets and returning said Hello packets over said alternative VLAN.

3. The method according to claim 1, wherein said remote switch comprises a user-interface of a core switch.

4. The method according to claim 1, further comprising the steps performed on said remote switch of:
detecting Hello packets with Other Path Down (OPD) flag set;
switching traffic to said alternative VLAN; and
sending Hello packet to said local edge switch with an OPD acknowledge flag set.

5. The method according to claim 4, further comprising the step of said local edge switch terminating the connection, and switching to said alternative VLAN in response to receiving a Hello packet with said OPD acknowledge flag set.

6. The method according to claim 1, further comprising the step of said local edge switch continuing to send Hello messages over said main VLAN in addition to said alternative VLAN.

7. The method according to claim 1, further comprising the step of said remote edge switch continuing to send Hello messages over said main VLAN in addition to said alternative VLAN.

8. The method according to claim 1 wherein a VLAN ID number of said main VLAN and said alternative VLAN differ in one bit.

9. The method according to claim 1, wherein a VLAN ID number of said main VLAN and said alternative VLAN differ in the least significant bit only.

10. The method according to claim 1, wherein the least significant bit (LSB) of a main VLAN ID is zero and the LSB of an alternative VLAN ID is one.

11. The method according to claim 1, further comprising the step of dropping packets received over said alternative VLAN by the edge switch that sensed the link failure.

12. The method according to claim 1, wherein said step of switching protected traffic comprises the stop of setting the least significant bit (LSB) of a VLAN ID and sending the packet back over the port from which it was received.

13. The method according to claim 1, further comprising the step of sending packets of said alternative VLAN to a user port in an edge switch terminating said connection when said packets are received over one of said network ports, and sending said alternative VLAN packets along said stack when received over any other network port.

14. The method according to claim 1, adapted to be implemented in an Application Specific Integrated Circuit (ASIC).

15. The method according to claim 1, adapted to be implemented in one or more Field Programmable Gate Array (FPGA) integrated circuits.

16. A method of providing connection protection in a Virtual Local Area Network (VLAN) based stack, said method comprising the steps of:
provisioning a main VLAN for a connection between a local edge switch and a remote switch;
provisioning an alternative VLAN for said connection on each edge switch in said stack;
provisioning a Multiprotocol Label Switching (MPLS) bypass tunnel between opposite ends of said stack;
switching, at edge switches on either side of a detected failed link, all protected traffic going through said failed link to said alternative VLAN, wherein if said connection begins on an edge switch that detected said link failure, switching protected traffic destined for said failed link to said alternative VLAN in response to detection of said link failure, and wherein if said connection does not begin on an edge switch that detected said link failure, modifying packets received over a network port on said main VLAN to said alternative VLAN and returning said modified packets over the same network port they were received over;
setting a flag in Hello packets on the eye switch that detected said failure before forwarding to said alternative VLAN, said flag for informing a remote edge switch to switch to said alternative VLAN;
forwarding said protected traffic via said bypass tunnel; and
upon reaching the end of said bypass tunnel, forwarding said protected traffic to said alternative VLAN.

17. The method according to claim 16, wherein said step of setting comprises the step of detecting Hello packets in the edge switch that detected the failure, setting an Other Path Down (OPD) flag in said Hello packets and returning said Hello packets over said alternative VLAN.

18. The method according to claim 16, wherein said remote switch comprises a user-interface of a core switch.

19. The method according to claim 16, wherein said MPLS bypass tunnel is established between two relevant ports of the same core switch.

20. The method according to claim 16, wherein said MPLS bypass tunnel is established between two ports of two different core switches.

21. The method according to claim 16, further comprising the steps performed on said remote switch of:
detecting Hello packets with Other Path Down (OPD) flag set;
switching traffic to said alternative VLAN; and
sending Hello packet to said local edge switch with an OPD acknowledge flag set.

22. The method according to claim 21, further comprising the step of said local edge switch, and terminating said connection switching to said alternative VLAN in response to receiving a hello packet with said OPD acknowledge flag set.

23. The method according to claim 16, further comprising the step of said local edge switch continuing to send Hello messages over said main VLAN in addition to said alternative VLAN.

24. The method according to claim 16, further comprising the step of said remote switch continuing to send Hello messages over said main VLAN in addition to said alternative VLAN.

25. The method according to claim 16, wherein a VLAN ID number of said main VLAN and said alternative VLAN differ in one bit.

26. The method according to claim 16, wherein a VLAN ID number of said main VLAN and said alternative VLAN differ in the least significant bit only.

27. The method according to claim 16, wherein the least significant bit (LSB) of a main VLAN ID is zero and the LSB of an alternative VLAN ID is one.

28. The method according to claim 16, further comprising the step of dropping packets received over said alternative VLAN by the edge switch that sensed the link failure.

29. The method according to claim 16, wherein said step of switching protected traffic comprises the step of setting the least significant bit (LSB) of a VLAN ID and sending the packet back over the port from which it was received.

30. The method according to claim 16, further comprising the step of sending packets of said alternative VLAN to a user port in an edge switch terminating said connection when said packets are received over one of said network ports, and sending said alternative VLAN packets along said stack when received over any other network port.

31. The method according to claim 16, adapted to be implemented in an Application Specific Integrated Circuit (ASIC).

32. The method according to claim 16, adapted to be implemented in one or more Field Programmable Gate Array (FPGA) integrated circuits.

33. A method of providing connection protection in a Virtual Local Area Network (VLAN) based stack, said method comprising the steps of:
provisioning a main VLAN for a connection between a local edge switch and a remote switch;
provisioning an alternative VLAN for said connection;
if said connection begins on the edge switch that detected a failure, switching protected traffic to said alternative VLAN;
if said connection does not begin on the edge switch that detected the failure, changing packets received over a network port on said main VLAN to said alternative VLAN and returning said changed packets over the same network port they were received from;
sending an Other Path Down (OPD) indication to a remote edge switch; and
switching protected user data to said alternative VLAN upon receipt of an OPD acknowledgement if the edge switch terminates said connection.

34. The method according to claim 33, wherein a VLAN ID number of said main VLAN and said alternative VLAN differ in one bit.

35. The method according to claim 33, wherein a VLAN ID number of said main VLAN and said alternative VLAN differ in the least significant bit only.

36. The method according to claim 33, wherein the least significant bit (LSB) of a main VLAN ID is zero and the LSB of an alternative VLAN ID is one.

37. The method according to claim 33, adapted to be implemented in an Application Specific Integrated Circuit (ASIC).

38. The method according to claim 33, adapted to be implemented in one or more Field Programmable Gate Array (FPGA) integrated circuits.

39. A packet processor for use in each edge switch in a Virtual Local Area Network (VLAN) based stack, each edge switch including a plurality of user ports and a plurality of network ports, comprising:
 means for maintaining the status of each link connected to the edge switch;
 means for maintaining a fast protection flag for each connection indicating whether, in the event of a link failure, packets received tagged with a main VLAN of said connection are to be returned over the network port on which they were received;
 means for tagging a received packet with an alternative VLAN in the event a link failure occurs and said received packet is for said main VLAN of a connection whereby said fast protection flag is set; and
 means for setting a flag in said received packets before forwarding to said alternative VLAN if said edge switch detected said link failure, said flag for indicating to a remote edge switch to switch to said alternative VLAN.

40. The packet processor according to claim 39, further comprising means for dropping a received packet in the event a link failure occurs and said received packet is for said main VLAN of a connection whereby said fast protection flag is not set.

41. The packet processor according to claim 39, further comprising means for maintaining a Hello packet flag adapted to indicate whether an Other Path Down (OPD) flag in a Hello packet to be returned is to be set.

42. The packet processor according to claim 39, comprising means for tagging a received Hello packet with an alternative VLAN and setting an Other Path Down (OPD) flag in the event a link failure occurs and a Hello packet is received for said main VLAN of a connection whereby a fast protection flag and a change Hello packet flag are set.

43. The packet processor according to claim 39, wherein said means for tagging with an alternative VLAN comprises means for setting the least significant bit (LSB) of the VLAN ID.

44. The packet processor according to claim 39, adapted to be implemented in an Application Specific Integrated Circuit (ASIC).

45. The packet processor according to claim 39, adapted to be implemented in a Field Programmable Gate Array (FPGA).

46. A method of providing connection protection in a Virtual Local Area Network (VLAN) network for use on a Multiprotocol Label Switching (MPLS) based core switch, wherein a main VLAN and an alternative VLAN are provisioned for a connection between a local edge switch and a remote edge switch, and wherein an MPLS bypass tunnel is provisioned between opposite ends of a stack to be protected, said method comprising the steps of:
 detecting failure of a link;
 switching protected traffic destined for said failed link to said alternative VLAN in response to detection or said link failure;
 setting a flag in packets before forwarding to said alternative VLAN, said flag for indicating to said remote edge switch to switch to said alternative VLAN; and
 forwarding said protected traffic to said bypass tunnel.

47. An edge switch in a Virtual Local Area Network (VLAN) based stack, comprising:
 a plurality of user ports for interfacing said edge switch to one or more users;
 a plurality of network ports for interfacing said edge switch to one or more communication links;
 packet processing means operative to:
  maintain the status of each link connected to the edge switch;
  maintain a fast protection flag for each connection indicating whether, in the event of a link failure, packets received tagged with a main VLAN of said connection are to be returned over the network port on which they were received;
  tag a received packet with an alternative VLAN in the event a link failure occurs and said received packet is for said main VLAN of a connection whereby said fast protection flag is set; and
  if said edge switch detected said link failure, setting a flag in said received packets before forwarding to said alternative VLAN, said flag for indicating to a remote edge switch to switch to said alternative VLAN.

* * * * *